(12) United States Patent
Corns (10) Patent No.: US 10,723,187 B2
(45) Date of Patent: Jul. 28, 2020

(54) UNIVERSAL RECEIVER HITCH PIN ASSEMBLY

(71) Applicant: Gary Corns, Vanceburg, KY (US)

(72) Inventor: Gary Corns, Vanceburg, KY (US)

(*) Notice: Subject to any disclaimer, the term of this patent is extended or adjusted under 35 U.S.C. 154(b) by 0 days.

(21) Appl. No.: 16/693,553

(22) Filed: Nov. 25, 2019

(65) Prior Publication Data
US 2020/0171895 A1 Jun. 4, 2020

Related U.S. Application Data (63) Continuation-in-part of application No. 15/207,940, filed on Jul. 12, 2016.

(60) Provisional application No. 62/282,141, filed on Jul. 25, 2015, provisional application No. 62/231,689, filed on Jul. 13, 2015.

(51) Int. Cl.
| | | |
|---|---|---|
| *B60D 1/28* | (2006.01) | |
| *B60D 1/36* | (2006.01) | |
| *B60D 1/167* | (2006.01) | |
| *B60D 1/06* | (2006.01) | |

(52) U.S. Cl.
CPC .............. *B60D 1/28* (2013.01); *B60D 1/167* (2013.01); *B60D 1/363* (2013.01); *B60D 1/06* (2013.01)

(58) Field of Classification Search
CPC ............. B60D 1/28; B60D 1/025; B60D 1/06
See application file for complete search history.

(56) References Cited

U.S. PATENT DOCUMENTS

| | | | | |
|---|---|---|---|---|
| 2,476,511 A | * | 7/1949 | Ruth | B60D 1/02 280/515 |
| 2,478,736 A | * | 8/1949 | Balzen | B60D 1/02 280/477 |
| 2,525,471 A | * | 10/1950 | Balzer | B60D 1/02 280/508 |
| 3,046,037 A | * | 7/1962 | Cain | B60S 9/02 280/477 |
| 3,146,003 A | * | 8/1964 | De Ronde | B60D 1/02 280/515 |
| 3,190,677 A | * | 6/1965 | Robbins | B60D 1/025 280/515 |
| 4,298,212 A | * | 11/1981 | Jamison | B60D 1/025 280/506 |
| 4,483,550 A | * | 11/1984 | Dubbe | B60D 1/025 280/515 |
| 4,783,094 A | * | 11/1988 | Sands | B60D 1/02 172/677 |
| 5,322,315 A | * | 6/1994 | Carsten | B60D 1/40 280/479.2 |
| 6,502,845 B1 | * | 1/2003 | Van Vleet | B60D 1/155 280/491.1 |

(Continued)

*Primary Examiner* — Jacob D Knutson
*Assistant Examiner* — Michael R Stabley
(74) *Attorney, Agent, or Firm* — Erise IP, P.A.

(57) ABSTRACT

A hitch pin assembly for attaching to a receiver hitch and coupling the receiver hitch to a hitch is disclosed. In some embodiments, the hitch pin assembly comprises a mounting assembly for mounting to the receiver hitch and a mounting bracket configured to attach to the mounting assembly and comprising a hitch pin hole for a hitch pin to slide therethrough. The hitch pin may be forced through the hitch pin hole, the receiver hitch, and the hitch by a spring mounted on the hitch pin and the mounting bracket.

18 Claims, 5 Drawing Sheets

(56) References Cited

U.S. PATENT DOCUMENTS

| | | | | |
|---|---|---|---|---|
| 6,948,732 B2 * | 9/2005 | Amacker | ................ | B60R 9/06 |
| | | | | 280/415.1 |
| 7,398,987 B2 * | 7/2008 | Roe | ..................... | B60D 1/28 |
| | | | | 280/515 |
| 7,494,154 B2 * | 2/2009 | Richards | ............... | B60D 1/66 |
| | | | | 180/11 |

* cited by examiner

UNIVERSAL RECEIVER HITCH PIN ASSEMBLY

RELATED APPLICATIONS

This non-provisional continuation-in-part application claims priority benefit, with regard to all common subject matter, of earlier-filed U.S. Non-Provisional patent application Ser. No. 15/207,940, filed on Jul. 12, 2016, and entitled "Universal mounted receiver hitch pin/fast latch pin." The identified earlier-filed non-provisional patent application is hereby incorporated by reference in its entirety into the present application.

BACKGROUND

1. Field

Embodiments of the invention generally relate to a receiver hitch pin. More specifically, embodiments of the invention relate to a receiver hitch pin with a fast latch locking mechanism for quick attachment and release of a trailer.

2. Related Art

Generally, vehicles utilize hitches for attaching a trailer, a vehicle, or another such object for towing behind a tow vehicle. Typical hitches comprise a loose hitch pin that is not attached to the hitch and that must be inserted through a hole in the receiver hitch and a hole in the hitch to couple the tow vehicle with a trailer for towing. It can be difficult to properly align the holes in the hitch or the trailer tongue with holes in the receiver hitch to slide the hitch pin therethrough. The hitch pin may be inserted into the hole of the receiver hitch and the hitch, or trailer, moved by hand or by moving the tow vehicle until they are aligned. Further, many hitches are coupled simply by a hitch pin and a securing pin preventing the hitch pin from rattling free. The hitch pin in typical use is loose and may be difficult to align as described above.

What is needed is a hitch pin that is securely attached to the receiver hitch such that the hitch pin may quickly and easily couple the hitch to the receiver hitch. The problems presented above may be solved by providing a receiver hitch pin assembly that is attached to the receiver hitch and spring loaded. When the hitch is inserted into the receiver hitch the hitch pin may be released decompressing the spring and extending the hitch pin through the hitch and the receiver hitch to couple the hitches. This allows the user to move the hitch and align the holes of the hitch with the holes of the receiver hitch while the spring forces the hitch pin through the holes rather than the user trying to manually move the hitch and the hitch pin as in typical systems described above. Further, in embodiments described herein, the hitch pin assembly may remain coupled to the receiver hitch thus providing storage such that the hitch pin is not loose.

SUMMARY

Embodiments of the invention solve the above mention problems by providing a quick hitch pin latching mechanism. A first embodiment of the invention provides for a hitch pin assembly for attaching to a receiver hitch and coupling a hitch to the receiver hitch, comprising a mounting bracket comprising a hitch pin hole, a hitch pin partially disposed in the hitch pin hole of the mounting bracket, a mounting assembly coupled to the mounting bracket and further coupled to the receiver hitch, wherein the receiver hitch comprises a receiver hitch hole aligned with the hitch pin hole when the mounting assembly is coupled to the receiver hitch; and a spring attached to the hitch pin and further attached to the mounting bracket and configured to force the hitch pin to slide through the hitch pin hole, the receiver hitch hole, and a hitch hole of the hitch, coupling the hitch to the receiver hitch.

A second embodiment of the invention provides for a hitch pin assembly for attaching to a receiver hitch and coupling the receiver hitch to a hitch, comprising a mounting bracket comprising a hitch pin hole, a mounting assembly coupled to the mounting bracket and further coupled to the receiver hitch, wherein the hitch pin hole and a receiver hitch hole are aligned when the mounting assembly is coupled to the receiver hitch, and a hitch pin partially disposed in the hitch pin hole of the mounting bracket and configured to slide through the receiver hitch hole in the receiver hitch and a hitch hole in the hitch coupling the hitch to the receiver hitch.

A third embodiment of the invention provides for a hitch pin assembly for attaching to a receiver hitch and coupling a hitch to the receiver hitch, comprising a mounting bracket comprising at least one hitch pin hole, a base, a neck, and a head, wherein the neck presents an enclosure and the at least one hitch pin hole is disposed in the head, a mounting assembly coupled to the mounting bracket and further coupled to the receiver hitch, and a hitch pin disposed in the at least one hitch pin hole and configured to slide through the at least one hitch pin hole and a receiver hitch hole of the receiver hitch when the mounting bracket is attached to the receiver hitch.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Use of directional terms such as "upper," "lower,", "top", "bottom", "above," "below", "front", "forward", "aft", "left" or "right", and etc. are intended merely for orientation, to describe the positions and/or orientations of various components of the invention relative to one another as the apparatus would be installed between a towing vehicle and a load, and are not intended to impose limitations on any position and/or orientation of any embodiment of the invention relative to any reference point external to the reference. It should also be noted that the terms tow object, tow vehicle, vehicle to be towed, and load may be used interchangeably.

In some embodiments, a hitch pin assembly is attached to a receiver hitch for quickly and easily coupling the receive hitch to a hitch. In some embodiments, the receiver hitch may be any hitch that is attached to a towing vehicle and a hitch may generally be any hitch for attaching to the receiver hitch that may be attached, for example, to a vehicle to be towed. In some embodiments, the hitch pin assembly may be attached to the receiver hitch utilizing friction such as, for example, attaching a U-bolt, or bolts and nuts compressing two plates on either side of the receiver hitch. The hitch pin assembly may be attached to the receiver hitch such that the hitch pin aligns with holes on the receiver hitch for receiving the hitch pin. The hitch may be inserted into the receiver hitch. The hitch pin may be secured outside of the receiver hitch such that the hitch may be inserted into the receiver hitch. The hitch pin may be secured by a pin projecting outward from the side of the hitch pin and secured into a notch on a bracket of the hitch pin assembly. Once the pin is removed from the notch a spring connected to the hitch pin may be released extending the hitch pin through the holes in the receiver hitch and the hitch thus coupling the receiver hitch and the hitch.

Figure 1A:
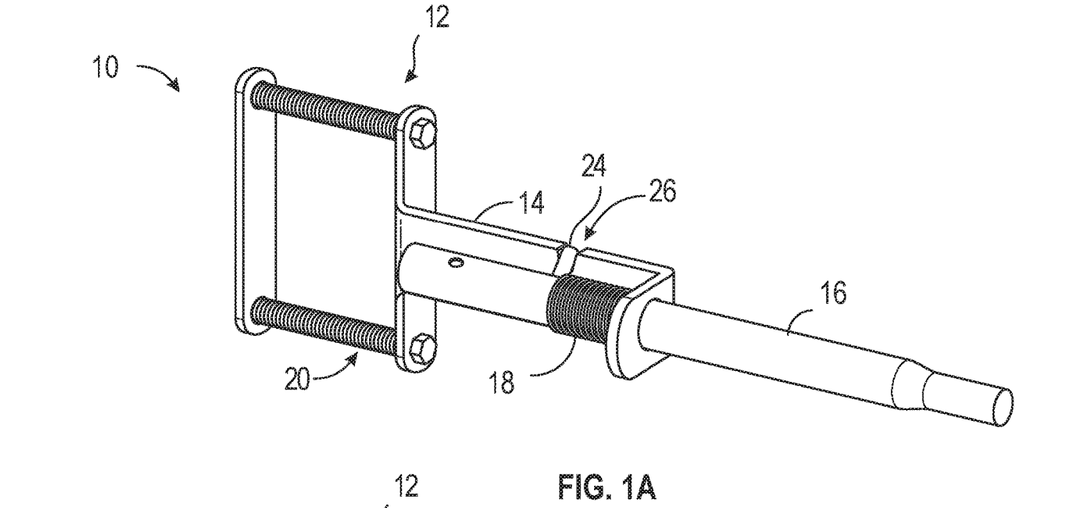
FIGS. 1A-B depict on embodiment of a hitch pin assembly in retracted and extended configurations.
Figure 1B:
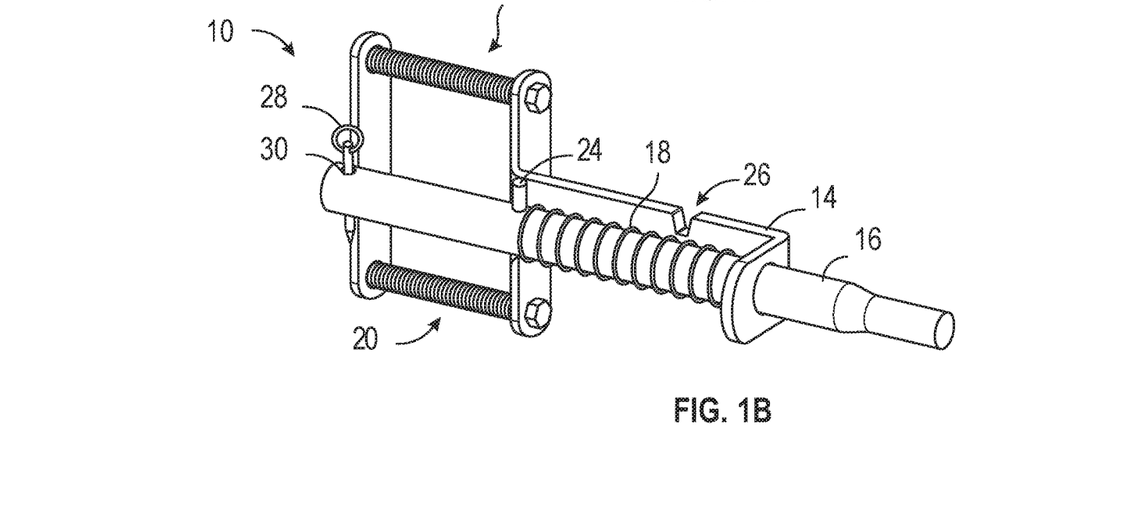
Figure 4A:
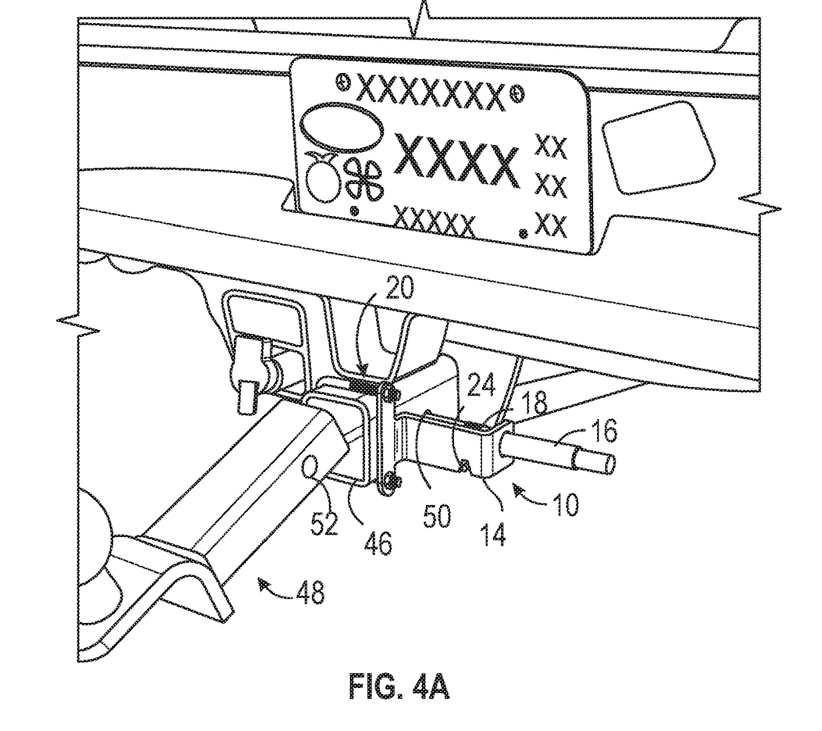
FIGS. 4A-B depict an embodiment of the hitch pin assembly coupling a receiver hitch to a hitch.
Figure 4B:
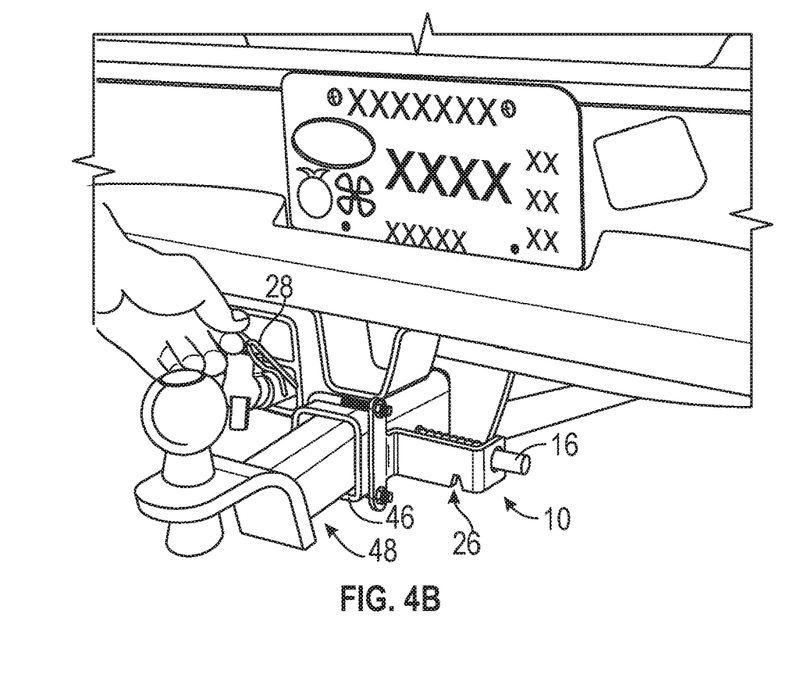

FIGS. 1A-B present an embodiment of a hitch pin assembly 10 comprising a mounting assembly 12, a mounting bracket 14, a hitch pin 16, and a spring 18. In some embodiments, the mounting assembly 12 may comprise at least one attachment device 20 for attaching the hitch pin assembly 10 to a hitch. In some embodiments, the attachment device 20 may be bolts and nuts as shown and in some embodiments the attachment device 20 may comprise a portion of a U-bolt as shown in FIGS. 4A-B. The mounting assembly 12 may be configured for mounting the hitch pin assembly 10 to a vehicle in a position such that the hitch pin 16 may slide through a hole in the receiver hitch of the vehicle and a hole in a trailer or hitch to couple a vehicle to a trailer or hitch. The mounting assembly 12 may be clamped onto the hitch at a location that aligns the hitch pin 16 with the hole in the hitch.

In some embodiments, the mounting assembly 12 may be configured to attach to standard one and one quarter, two inch, two and half inch, and three inch receiver hitches, or otherwise any class 1-5 standard hitches where the measurement is the interior dimension of the receiver hitch and the hitch pin 16 may be ⅝ inches in diameter. In some embodiments, the hitch pin assembly 10 may be configured to attached to any size receiver hitch or may be custom manufactured. The hitch pin assembly 10 may be sized to fit class I hitches with a 1¼ inch square receiver opening and weight carrying maximum gross trailer weight (GTW) of 2,000 pounds and 200 pound maximum trailer tongue weight (TW); class II hitches—2¼ inch square receiver hitch opening, 3,500 pound GTW, and 300 pound TW; class III hitches—2 inch square receiver opening, weight carrying 6,000 pound GTW, 600 pound TW, weight distributing 10,000 GTW and 1,000 TW; class IV—2 inch square receiver opening, weight carrying 10,000 pounds GTW and 1,000 pounds TW, weight distributing 14,000 pounds GTW and 1,400 pounds TW; and class V hitches at 2½ inch square receiver opening, weight carrying 12,000 GTW and 1,200 TW, weight distributing 17,000 pound GTW and 1,700 pound TW. In some embodiments, the hitch pin assembly 10 may be sized to fit any hitch including custom sizes. In some embodiments, the receiver hitch inner opening is at least 1¼ inches wide and in some embodiments the receiver hitch inner opening is no wider than 3 inches. Further, the hitch pin 16 may be standard ½-⅝ inch diameter and 2-3⅝ inch useable length. However, the hitch pin 16 may be any other custom size as needed. In some embodiments, the hitch pin 16 is a cylinder presenting a circular cross section, but the hitch pin 16 cross section may be square, triangular, oval, or any other shape that may be useful in embodiments of the invention.

In some embodiments, a hole in the receiver hitch of the vehicle may be aligned with a hole in a trailer mount or a secondary receiver hitch such as, for example, a ball mount. When the spring 18 is released, the spring 18 may force the hitch pin 16 into the extended position as depicted in FIG. 1B. In the extended position, the hitch pin 16 may extend through the holes attaching the trailer to the vehicle.

In some embodiments, the mounting bracket 14 may be attached to or, in some embodiments, comprised of the mounting assembly 12. The mounting bracket 14 may provide mounting holes for attaching to the mounting assembly 12 and at least one hole for the hitch pin to slide therethrough discussed in more detail in reference to FIG. 2 below.

FIG. 1A presents an embodiment of the hitch pin assembly 10 in which the hitch pin 16 is configured in a retracted configuration. The retracted position of the hitch pin 16 provides a configuration of the hitch pin assembly 10 for removing and inserting the trailer or secondary receiver hitch while the hitch pin 16 is positioned away from the receiver hitch of the vehicle and the hitch of the trailer. The hitch pin 16 may be configured in the retracted position by pulling on the handle to compress the spring 18 and rotating the hitch pin 16 such that the pin 24 of the hitch pin 16 is positioned into the notch 26 provided on the mounting bracket 14. The notch 26 on the mounting bracket 14 may provide a locking mechanism to secure the pin 24 of the hitch pin 16 such that the spring 18 remains compressed while the user is not holding the hitch pin 16. In some embodiments, the notch 26 is simply an indention or a cut-out and may be configured with ninety-degree corners, or obtuse (as shown), or acute angles for securing the pin. In some embodiments, the notch 26 may be configured with a locking mechanism such as a carabiner that may rotate or screw into place locking the pin 24 in the notch 26.

FIG. 1B depicts the hitch pin 16 in an extended configuration. The extended position provides a configuration for coupling the trailer hitch of a trailer to the receiver hitch of a vehicle. In some embodiments, the hitch pin 16 may be rotated removing the pin 24 from the notch 26 of the mounting bracket 14 and allowing the spring 18 to naturally extend. The spring 18, releasing tension when extending, forces the hitch pin 16 into the aligned holes of the receiver hitch and the trailer hitch thus securing the trailer, or, in some embodiments, a secondary receiver hitch, to the vehicle. In some embodiments, a securing pin 28 such as, for example, a cotter pin may be attached through a securing hole 30 at an end of the hitch pin 16 distal a handle, or a back side of the hitch pin 16, to secure the securing hitch pin 16 through the trailer and the receiver hitch holes.

Figure 2:
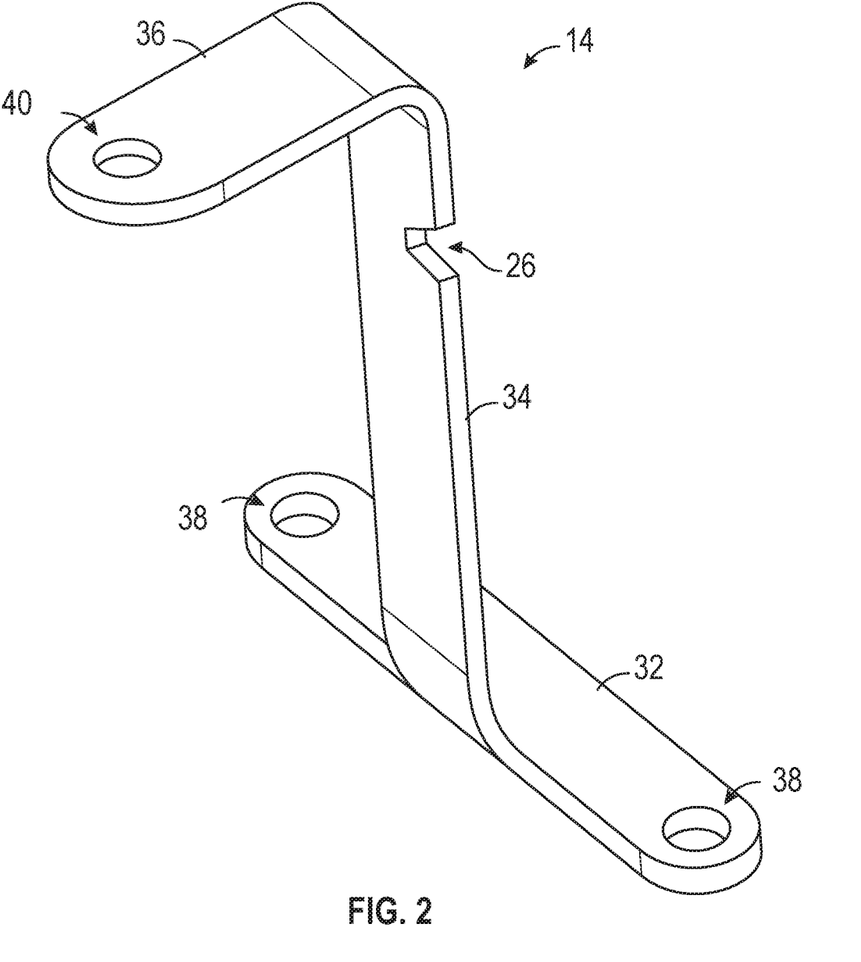
FIG. 2 depicts an embodiment of a mounting bracket.
Figures 5A, 5B:
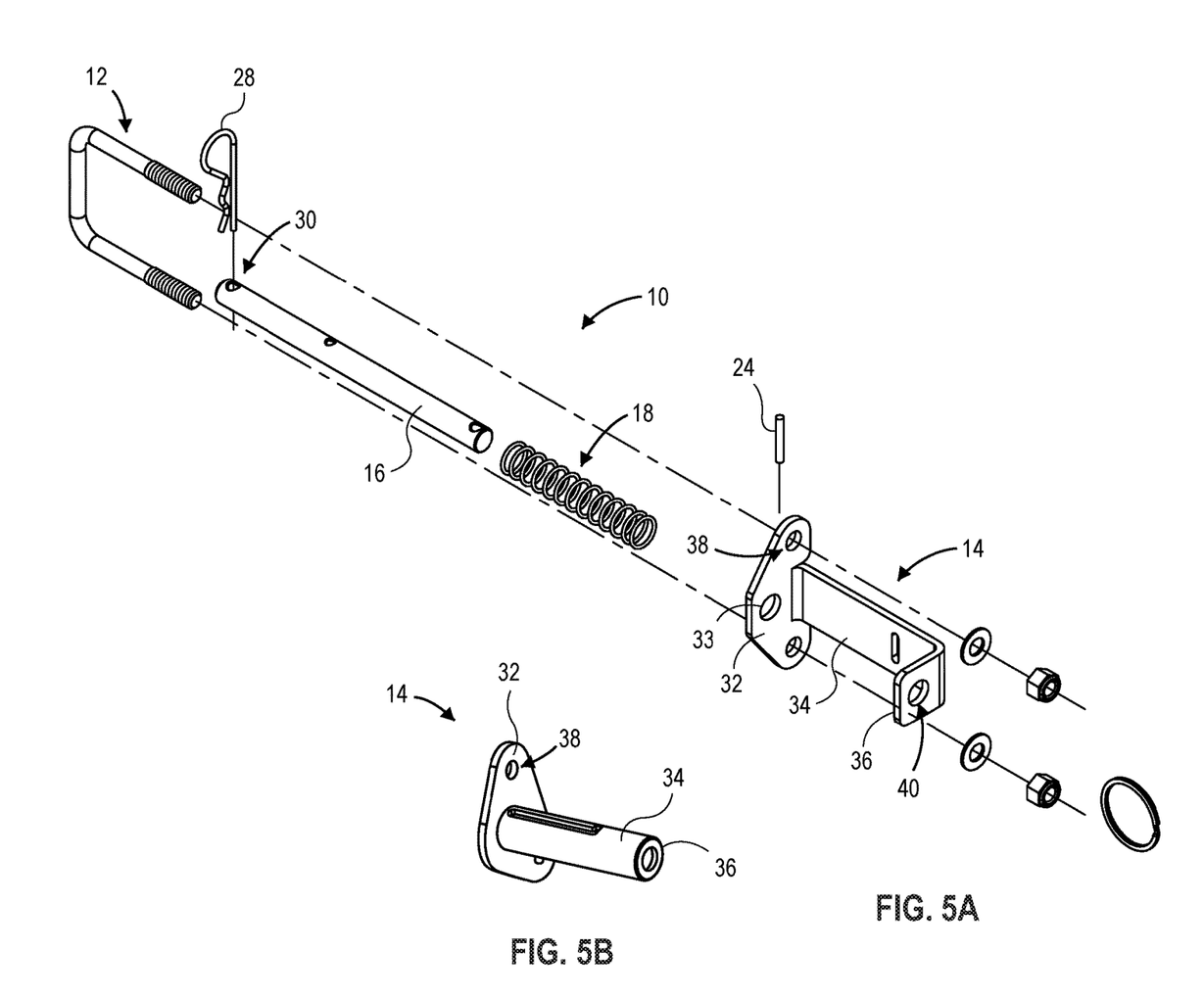
FIGS. 5A-B depict an alternative embodiment of the hitch pin assembly.

FIG. 2 depicts an embodiment of the mounting bracket 14 comprising a base 32, a neck 34, and a head 36. In some embodiments, the base 32 of the mounting bracket 14 may be a plate comprising mounting holes 38 for attaching the mounting assembly 12 via exemplary bolts as described above. In some embodiments, the base 32 of the mounting bracket 14 may be attached to the neck 34 of the mounting bracket 14. The neck 34 of the mounting bracket 14 may extend at substantially a ninety-degree angle from the base 32 as depicted in FIG. 2. The neck 34 may comprise an intermediate extension connecting the base 32 to the head 36 of the mounting bracket 14. In some embodiments, the mounting bracket 14 may fully or partially enclose the hitch pin 16 as depicted in FIGS. 5A-B and described in detail below.

In some embodiments, the neck 34 further comprises the notch 26 for securing the pin 24. The notch 26 provides a location for the pin 24 to be secured when the hitch pin 16 is in the retracted position. Once the hitch pin 16 is retracted and rotated the pin 24 slides into the notch 26 securing the hitch pin 16. While secured by the notch 26, the hitch pin 16 may be released by the user to free the use's hands while the spring 18 is compressed and the hitch pin 16 is in the retracted position.

In some embodiments, the neck 34 of the mounting bracket 14 is configured to be connected to the head 36 of the mounting bracket 14. The head 36 may be configured at a ninety-degree angle to the neck 34 and parallel to the base 32. The head 36 may comprise a hitch pin hole 40 that may be slightly larger in diameter than the hitch pin 16 such that the hitch pin 16 may slide therethrough. The hitch pin hole 40 may be configured such that the hitch pin 16 may slide therethrough and the spring 18 may contact an inner side, or spring side, of the head 36 such that the spring 18 may compress against the head 36.

Figure 3:
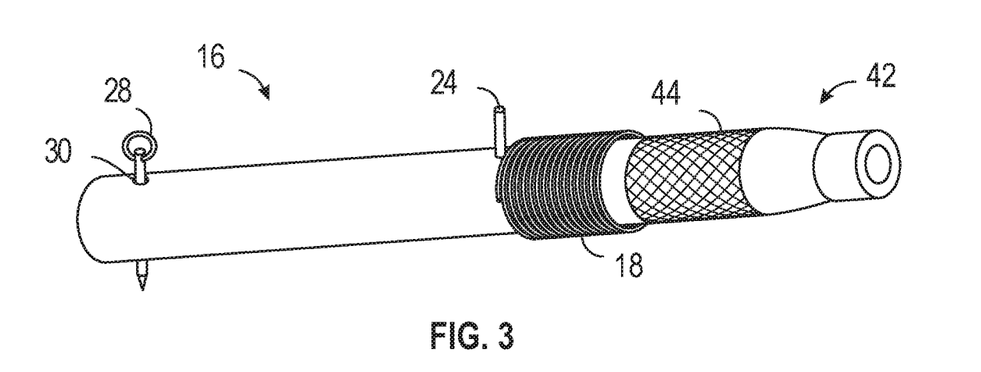
FIG. 3 depicts an embodiment of a hitch pin.

An exemplary embodiment of the hitch pin 16 comprising a handle 42, a grip 44, the spring 18, the pin 24, the securing hole 30, and the securing pin 28 is presented in FIG. 3. In some embodiments, the hitch pin 16 is configured to slide through the mounting bracket 14 hitch pin hole 40, the receiver hitch, and the trailer hitch as depicted in, and described in detail in reference to, FIGS. 4A-B. As such, the hitch pin 14 is configured to withstand a normal amount of shear force that may be imparted by a vehicle towing a trailer. Further, the hitch pin assembly 10 may be manufactured for different towing loads for small loads such as, for example, bicycle and luggage racks, medium loads such as, for example, trailers for towing cars and boats, and large loads such as, for example, recreational vehicles. In some embodiments, the towing vehicle may be a car, truck, or commercial vehicle towing a trailer, that may carry a car, truck, trailer for hauling, or any other load that may be necessary to tow behind the vehicle.

In some embodiments, the spring 18 is attached to the hitch pin 16 at a spring hole (not shown) and wrapped around the hitch pin 16 to provide a force for inserting the hitch pin 16 into the receiver hitch. The spring 18 may be compressed against the head 36 of the mounting bracket 14 when the hitch pin 16 is in the retracted position. When the hitch pin 16 is released the spring 18 may extend, releasing the compressive force in the spring 18 to move the hitch pin 16 into the extended position.

Though embodiments described herein provide for the spring 18 in compression when the hitch pin 16 is in the retracted position and the spring 18 in natural or tension when the hitch pin 16 is in the extended position, the alternative may be true. In some embodiments, the spring 18 may be in tension or natural when the hitch pin 16 is in the retracted position and in compression or natural when the hitch pin 16 is in the extended position. Any arrangement of the spring 18 may be contemplated for use such that the hitch pin 16 may be configured to be in an extended and a retracted position. In some embodiments, a spring 18 may not be needed and the hitch pin 16 may be inserted and removed from the receiver hitch manually without the aid of the spring 18.

In some embodiments, the hitch pin 16 comprises the securing hole 30 at an end distal the handle 42. When the hitch pin 16 is in the extended position, the securing pin 28 may be placed through the securing hole 30 to secure the hitch pin 16 through the receiver hitch. The securing pin 28 may be placed in the hitch pin 16 such that the hitch pin 16 cannot slide back through the receiver hitch (and trailer mount) unexpectedly releasing the trailer from the vehicle. In some embodiments, the securing pin 28 may be a cotter pin, a bolt, a screw or any such pin that may be long enough to prevent the hitch pin 16 from sliding through the receiver hitch.

In some embodiments, the hitch pin 16 comprises the grip 44. The grip 44 may be at an end of the hitch pin 16 proximal the spring 18 and the handle 42. In some embodiments, the grip 44 may be an add-on grip such as rubber, fabric, or plastic and in some embodiments, the grip 44 may be a texture such as small indentions or cuts in the hitch pin 16 that allow a user's hand to easily grip the hitch pin 16 in wet or icy conditions. In some embodiments, the grip 44 is in lieu of a handle and in some embodiments both the grip and the handle 42 are present.

In some embodiments, the handle 42 is attached or manufactured on a proximal end of the hitch pin 16. The handle 42 may be a bulb or may provide the grip 44 or may be any type handle that may be manufactured or attached to the hitch pin 16. In some embodiments, the hitch pin 16 is manufactured with threads and the handle may be screwed into the hitch pin 16.

FIG. 4A depicts the hitch pin assembly 10 in the retracted position and attached to a receiver hitch 46. The retracted configuration of the hitch pin assembly 10 allows a hitch 48 such as the secondary receiver hitch or a ball hitch, as shown, to be slid onto the receiver hitch 46 and the receiver hitch hole 50 aligned with a hitch hole 52 for receiving the hitch pin 16. The hitch pin 16 is held in position by rotating the hitch pin 16 such that the pin 24 is positioned in the notch 26 of the mounting bracket 14. When the pin 24 is positioned in the notch 26 the pin 24 holds the hitch pin 16 in the retracted positioned and the spring 18 compressed.

In some embodiments, when configured in the retracted position, the hitch pin assembly 10 may be mounted to the receiver hitch 46 by tightening the attachment device 20 of the mounting assembly 12. In the embodiment depicted in FIGS. 4A and 4B, the attachment device 20 is a U-bolt. However, any standard bolt and plate as shown in FIGS. 1A and 1B may be used.

In some embodiments, the hitch 48, or exemplary ball hitch as shown, may be a trailer hitch, weight distribution hitch, or the trailer itself. In some embodiments, the receiver hitch 46 may be a rear receiver hitch, a front mount hitch, a bumper hitch as depicted in FIGS. 4A-B, or any other hitch that may be attached to the tow vehicle.

FIG. 4B depicts the hitch pin assembly 10 in the extended position. A user is securing the hitch pin 16 by placing the securing pin 28 in the securing hole 30 of the hitch pin 16. As depicted, the securing pin 28 is a cotter pin. However, in some embodiments, the securing pin 28 may be a bolt, screw, and clamp. The hitch pin 16 is rotated such that the pin 24 is removed from the notch 26 releasing the hitch pin 16 and allowing the hitch pin 16 to extend through the hitch hole 52 and the receiver hitch hole 50. Once the pin 24 is removed from the notch 26 the spring 18 is free to extend and the hitch pin 16 is free to be inserted into the receiver hitch 46 and the hitch 48 in the extended position. The extended position couples the hitch 48 to the receiver hitch 46 such that a trailer may be coupled to the tow vehicle in a configuration suitable for towing.

In some embodiments, once the hitch pin 16 is in the extended position with the hitch pin 16 placed through the receiver hitch hole 50 and the hitch hole 52, the securing pin 28 may be inserted into the securing hole 30 of the hitch pin 16 to secure the hitch pin 16 at a distal end to the spring 18 of the hitch pin assembly 10. The securing pin 28 may aid in securing the hitch pin 16 in the receiver hitch hole 50 and the hitch hole 52. In some embodiments, there is no spring 18 and the securing pin 28 may be necessary as the only means for securing the hitch pin 16 through the receiver hitch 46 and the hitch 48.

In an alternative embodiment depicted in FIG. 5B, the mounting bracket 14 may form an enclosure for the spring 18 and partially enclose the hitch pin 16. The mounting bracket 14 may comprise a substantially square cross section or may be triangular, circular, or any other cross-sectional shape that may function to enclose the hitch pin 16, spring 18, or both.

In some embodiments, as depicted in FIGS. 5A-B, the base 32 may also comprise a base hole 33 configured for the hitch pin 16 to slide therethrough. The base 32 may comprise a side opposite the head 36 forming a side of the enclosure. The head 36 and the base 32 may form opposite sides and both comprise holes for the hitch pin 16 to slide therethrough. In some embodiments, the neck 34 is the enclosure and is simply a rectangularly shaped box enclosing the spring 18 and other components described above. The alternative embodiment of FIGS. 5A-B may also comprise the mounting assembly 12 and parts, features, and functions described in embodiments of the hitch pin assembly 10 herein.

Figure 6:
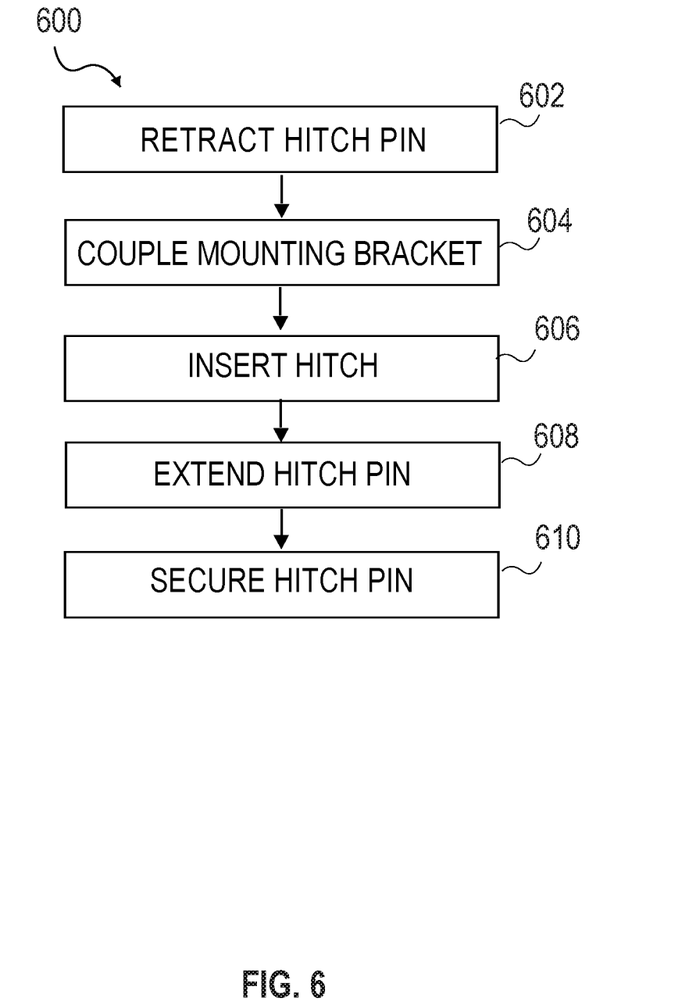
FIG. 6 depicts a method of attaching a hitch to a receiver hitch using the hitch pin assembly.

FIG. 6 presents an exemplary flow diagram 600 representing a method of securing the hitch 48 to the receiver hitch 46 using the quick coupling hitch pin assembly 10. At a Step 602, the hitch pin 16 is secured in the retracted position. The hitch pin 16 may be retracted or otherwise stored in the retracted position by pulling the hitch pin 16 by the handle 42 and the grip 44 such that the hitch pin 16 is clear from the mounting assembly 12. In some embodiments, the spring 18 compresses as the hitch pin 16 is pulled into the retracted position. The hitch pin 16 may then be rotated such that the pin 24 is inserted into the notch 26. The hitch pin 16 may then be released by the user and the pin 24 in the notch 26 holds the hitch pin 16 in the retracted position. In the retracted position, the mounting assembly 12 may be coupled to the receiver hitch 46 and the hitch is free to be inserted into the receiver hitch 46.

At a Step 604, the mounting assembly 12 is attached to the receiver hitch 46. In some embodiments, the mounting assembly 12 may comprise bolts and nuts along with a mounting plate as depicted in FIGS. 1A-B. Alternatively, the mounting assembly 12 may comprise a U-bolt with nuts as depicted in FIGS. 4A-B and 5A. Either way, the mounting assembly 12 may be removed or loosened from the mounting bracket 14 such that the mounting assembly 12 may slide over the receiver hitch 46. Once the receiver hitch pin assembly 10 is in place such that the hitch pin 16 is aligned with the receiver hitch hole 50, the nuts and bolts of the mounting assembly may be tightened to couple the hitch pin assembly 10 to the receiver hitch 46 as depicted in FIGS. 4A-B.

At a Step 606, the hitch 48 is inserted into the receiver hitch 46 and aligned with the receiver hitch hole 50. Once the mounting assembly 12 is tightened onto the receiver hitch 46 and the receiver hitch pin assembly 10 is coupled to the receiver hitch 46, the hitch 48 may be coupled to the receiver hitch 46. The hitch 48 may slide into the receiver hitch 46 such that the hitch hole 52 is aligned, or close to aligned, with the receiver hitch hole 50.

At a Step 608, the hitch pin 16 is released and extended through the receiver hitch hole 50 and the hitch hole 52. The user may rotate the hitch pin 16 such that the pin 24 is removed from the notch 26 and release the hitch pin 16 such that the spring 18 is free to decompress extending the hitch pin 16 into the receiver hitch hole 50 and the hitch hole 52. The hitch pin 16 may slide through the hitch 48 and the receiver hitch 46 coupling the hitches allowing the vehicle to pull the trailer. If the hole alignment is not perfect, the hitch pin 16 may be released and slide through the receiver hitch hole 50 only. The hitch 48 may be adjusted such that the hitch hole 52 is then aligned and the spring 18 fully extends forcing the hitch pin 16 through the hitch hole 52.

At a Step 610, the hitch pin 16 is secured in the extended position. Once the hitch pin 16 is through the receiver hitch 46 and the hitch 48, the hitch pin 16 may be secured using the securing pin 28 inserted into the securing hole 30 as depicted in FIGS. 3 and 4B. The securing pin 28 may prevent the hitch pin 16 from vibrating back through the hitch 48 and the receiver hitch 46 and causing the hitches to inadvertently become decoupled.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A hitch pin assembly for attaching to a receiver hitch and coupling a hitch to the receiver hitch, comprising:
    a mounting bracket comprising a hitch pin hole;
    a hitch pin partially disposed in the hitch pin hole of the mounting bracket;
    a mounting assembly coupled to the mounting bracket and further coupled to the receiver hitch,
    wherein the receiver hitch comprises a receiver hitch hole aligned with the hitch pin hole when the mounting assembly is coupled to the receiver hitch;
    a spring attached to the hitch pin and further attached to the mounting bracket and configured to force the hitch pin to slide through the hitch pin hole, the receiver hitch hole, and a hitch hole of the hitch, coupling the hitch to the receiver hitch;
    a pin disposed on the hitch pin; and
    a notch disposed on the mounting bracket for receiving the pin,
    wherein the pin is secured in the notch preventing the pin from sliding through the receiver hitch hole when the hitch pin is in a retracted position.

2. The hitch pin assembly of claim 1,
    further comprising a handle disposed on the hitch pin,
    wherein the spring is compressed against a head of the mounting bracket in the retracted position.

3. The hitch pin assembly of claim 1, wherein the hitch is coupled to the receiver hitch by the hitch pin disposed in the hitch hole and the receiver hitch hole when the spring is in an extended position.

4. The hitch pin assembly of claim 3, further comprising a securing pin partially disposed in a securing hole in the hitch pin on an end of the hitch pin distal the spring.

5. The hitch pin assembly of claim 1,
    wherein the mounting assembly is a U-bolt attached to the receiver hitch, and
    wherein a receiver hitch inner opening is at least 1-¼ inches wide.

6. The hitch pin assembly of claim 1, wherein the mounting assembly comprises at least one bolt for securing a plate to a base of the mounting bracket and for securing the receiving hitch between the plate and the base.

7. The hitch pin assembly of claim 1, wherein the hitch pin is cylindrical and a diameter of the cross section of the hitch pin is in the range of ½ to ⅝ inches and a length of the hitch pin is in the range of 2 inches to 3-⅝ inches.

8. The hitch pin assembly of claim 1,
    wherein the mounting bracket comprises a base, a neck, and a head,
    wherein the neck is disposed at substantially a ninety degree angle to the base, and
    wherein the head is disposed at substantially a ninety degree angle to the neck and is substantially parallel to the base.

9. The hitch pin assembly of claim 8, wherein the hitch pin hole is in the head and the hitch pin is disposed substantially parallel to the neck.

10. A hitch pin assembly for attaching to a receiver hitch and coupling the receiver hitch to a hitch, comprising:
    a mounting bracket comprising a hitch pin hole;
    a mounting assembly coupled to the mounting bracket and further coupled to the receiver hitch,
    wherein the hitch pin hole and a receiver hitch hole are aligned when the mounting assembly is coupled to the receiver hitch;
    a hitch pin partially disposed in the hitch pin hole of the mounting bracket and configured to slide through the receiver hitch hole in the receiver hitch and a hitch hole in the hitch coupling the hitch to the receiver hitch;
    a pin disposed on the hitch pin; and
    a notch disposed on the mounting bracket for receiving the pin,
    wherein the pin is secured in the notch preventing the pin from sliding through the receiver hitch hole when the hitch pin is in a retracted position.

11. The hitch pin assembly of claim 10, further comprising a securing pin at least partially disposed in a securing hole securing the hitch pin through the receiver hitch and through the hitch.

12. The hitch pin assembly of claim 10,
    wherein the mounting assembly is attached to the receiver hitch using at least one plate and at least two bolts, and
    wherein a width of a receiver hitch inner opening is in the range of 1-¼ inches to 3 inches.

13. The hitch pin assembly of claim 10,
    further comprising a spring attached to the hitch pin and the mounting bracket and configured to force the hitch pin through the receiver hitch hole and the hitch pin hole,
    wherein the hitch pin hole is disposed in a head of the mounting assembly.

14. The hitch pin assembly of claim 13,
    wherein the mounting bracket further comprises a base comprising a base hole configured for the hitch pin to slide therethrough, and
    wherein the base and the head are substantially parallel and comprise opposite ends of an enclosure enclosing the spring and at least partially enclosing the hitch pin.

15. The hitch pin assembly of claim 14, wherein the hitch pin is cylindrical and a diameter of the hitch pin is in the range of ½ inch to ⅝ inches and a length of the hitch pin is in the range of 2 inches to 3-⅝ inches.

16. A hitch pin assembly for attaching to a receiver hitch and coupling a hitch to the receiver hitch, comprising:
    a mounting bracket comprising at least one hitch pin hole, a base, a neck, and a head,
    wherein the neck presents an enclosure and the at least one hitch pin hole is disposed in the head;
    a mounting assembly coupled to the mounting bracket and further coupled to the receiver hitch;

a hitch pin disposed in the at least one hitch pin hole and configured to slide through the at least one hitch pin hole and a receiver hitch hole of the receiver hitch when the mounting bracket is attached to the receiver hitch;

a pin disposed on the hitch pin; and a notch disposed on the mounting bracket for receiving the pin, wherein the pin is secured in the notch preventing the pin from sliding through the receiver hitch hole when the hitch pin is in a retracted position.

17. The hitch pin assembly of claim 16, further comprising a spring attached to the hitch pin and the mounting bracket and configured to force the hitch pin through the receiver hitch hole and the at least one hitch pin hole.

18. The hitch pin assembly of claim 17, wherein the spring is attached to the mounting bracket and forces the hitch pin through the at least one hitch pin hole, the receiver hitch hole, and a hitch hole in the hitch coupling the hitch to the receiver hitch when the spring is in an extended position, and wherein the hitch pin is secured by a securing pin on an end of the hitch pin distal the spring.

* * * * *